(12) United States Patent
Gim

(10) Patent No.: US 10,719,382 B2
(45) Date of Patent: Jul. 21, 2020

(54) COLLECTING STATE RECORDS OF CORES IN A DATA STORAGE DEVICE

(71) Applicant: SK hynix Inc., Gyeonggi-do (KR)

(72) Inventor: Yeong Dong Gim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 134 days.

(21) Appl. No.: 15/963,727

(22) Filed: Apr. 26, 2018

(65) Prior Publication Data

US 2019/0102245 A1 Apr. 4, 2019

(30) Foreign Application Priority Data

Sep. 29, 2017 (KR) ........................ 10-2017-0127233

(51) Int. Cl.
*G06F 11/00* (2006.01)
*G06F 11/07* (2006.01)
*G06F 13/24* (2006.01)

(52) U.S. Cl.
CPC ........ *G06F 11/0778* (2013.01); *G06F 11/073* (2013.01); *G06F 11/0724* (2013.01); *G06F 11/0751* (2013.01); *G06F 11/0787* (2013.01); *G06F 11/0793* (2013.01); *G06F 13/24* (2013.01)

(58) Field of Classification Search
CPC ............. G06F 11/0724; G06F 11/0778; G06F 11/079; G06F 11/2242; G06F 11/2736
See application file for complete search history.

(56) References Cited

U.S. PATENT DOCUMENTS

| 5,884,019 A * | 3/1999 | Inaho .................. G06F 11/1438 714/13 |
|---|---|---|
| 9,038,070 B2 | 5/2015 | Lippett et al. |
| 9,448,871 B2 * | 9/2016 | Suzuki ............... G06F 11/0724 |
| 9,496,216 B2 * | 11/2016 | Chun ..................... H01L 23/50 |
| 9,684,517 B2 * | 6/2017 | Chen ..................... G06F 9/4406 |
| 2009/0077420 A1 * | 3/2009 | Sunavala ............ G06F 11/0721 714/25 |
| 2016/0132382 A1 * | 5/2016 | Frolikov ............. G06F 11/0778 714/45 |
| 2017/0083395 A1 * | 3/2017 | Beard ................... G06F 11/079 |

* cited by examiner

*Primary Examiner* — Michael Maskulinski
(74) *Attorney, Agent, or Firm* — IP & T Group LLP

(57) ABSTRACT

A data storage device includes a nonvolatile memory device; and a controller configured to include a plurality of cores, wherein, when an error occurs in at least one core among the cores, a first core which is coupled with the nonvolatile memory device transmits state records of one or more core among the cores at an error occurrence time, to the nonvolatile memory device.

20 Claims, 12 Drawing Sheets

FIG.1
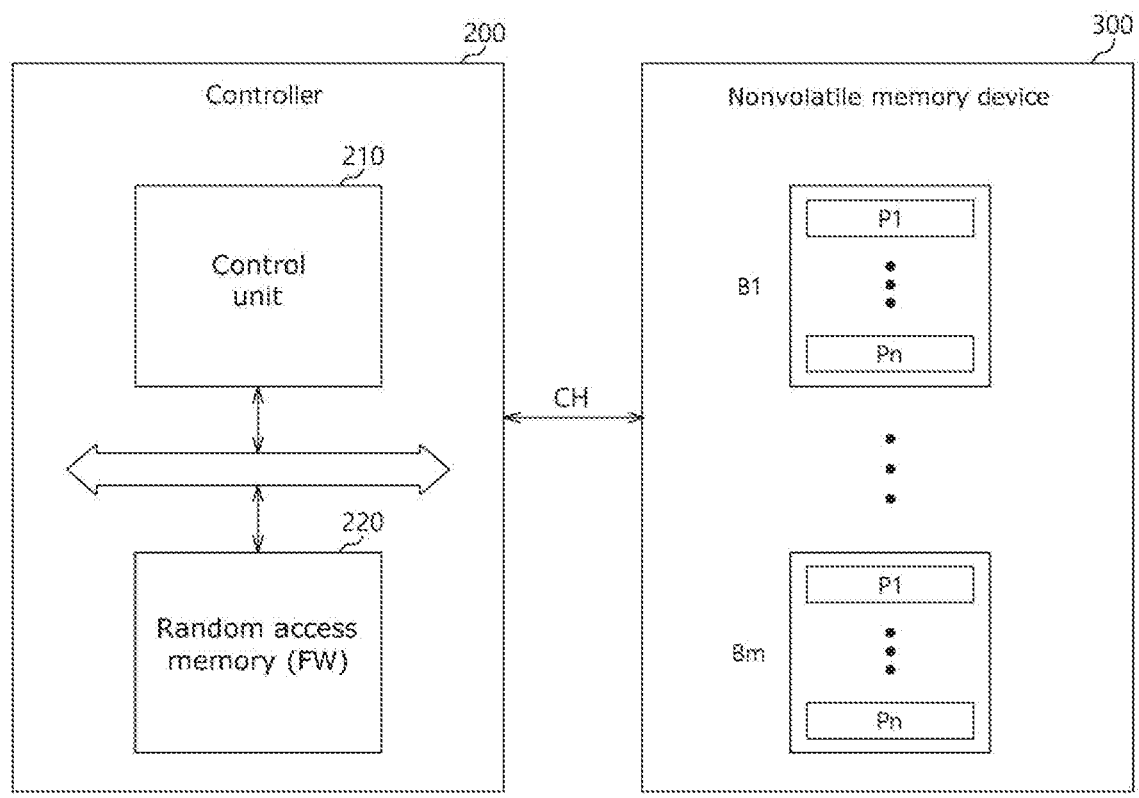
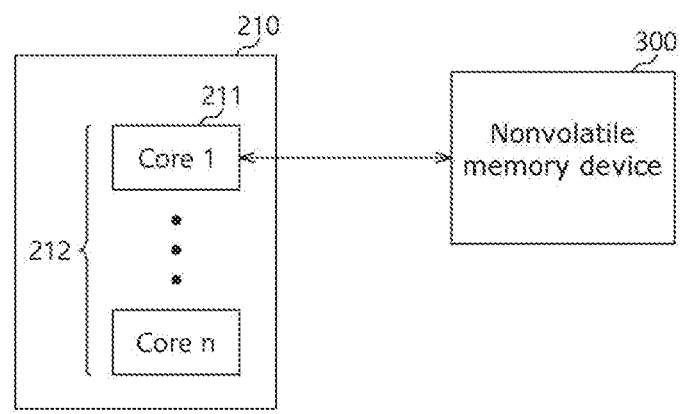

COLLECTING STATE RECORDS OF CORES IN A DATA STORAGE DEVICE

CROSS-REFERENCES TO RELATED APPLICATION

The present application claims priority under 35 U.S.C. § 119(a) to Korean application number 10-2017-0127233, filed on Sep. 29, 2017, which is incorporated herein by reference in its entirety.

BACKGROUND

1. Technical Field

Various embodiments generally relate to a data storage device, and, more particularly, to a data storage device including a nonvolatile memory device.

2. Related Art

A data storage device may be configured to store the data provided from an external device, in response to a write request from the external device. Also, the data storage device may be configured to provide stored data to the external device, in response to a read request from the external device. The external device as an electronic device capable of processing data may include a computer, a digital camera or a mobile phone. The data storage device may operate by being built in the external device, or may operate by being manufactured in a separable form and being coupled to the external device.

A data storage device using a memory device provides advantages in that, since there is no mechanical driving part, stability and durability are excellent, information access speed is high and power consumption is small. Data storage devices having such advantages include a universal serial bus (USB) memory device, memory cards having various interfaces, a universal flash storage (UFS) device, and a solid state drive (SSD).

When analyzing an error which occurred under a multi-core solution environment, it may be impossible to analyze and interpret the error by using only the state record of a core in which the error has occurred. For example, if an error occurs while a plurality of cores are operating in cooperation with one another, it may be impossible to precisely analyze a cause by using only the state record of a core in which the error has occurred. State informations of all the cores which are involved with an operation in cooperation with one another are needed. In particular, in this case, in order to analyze a cause of the error or correct the error, it is necessary to obtain state records at a time when the error has occurred.

SUMMARY

Various embodiments are directed to a data storage device capable of increasing the possibility of analyzing a cause of an error in the multicore environment, and an operating method thereof.

In an embodiment, a data storage device may include: a nonvolatile memory device; and a controller configured to include a plurality of cores, wherein, when an error occurs in at least one core among the cores, a first core which is coupled with the nonvolatile memory device transmits state records of one or more core among the cores at an error occurrence time, to the nonvolatile memory device.

In an embodiment, a method for operating a data storage device may include: determining, by a controller, whether an error has occurred in a plurality of cores; collecting, when it is determined that an error has occurred, state records of one or more core among the cores at an error occurrence time, by a first core; and transmitting the state records to a nonvolatile memory device from the first core.

In an embodiment, a method for operating a data storage device may include: determining, by a controller, whether an error has occurred in a plurality of cores; obtaining, when it is determined that an error has occurred, in a shared area in which data of the cores are stored, state records of one or more cores among the cores at an error occurrence time, based on the data; and transmitting the state records stored in the shared area, to a nonvolatile memory device from a first core.

In an embodiment, a memory system may include: a memory device; and a controller including a plurality of cores, and suitable for detecting one or more errors of the cores; temporarily storing therein information regarding the errors at one or more of first periodic and non-periodic time points; and controlling the memory device to store the collected information at one or more of second periodic and non periodic time points.

In the data storage device according to the embodiment, when an error has occurred in a storage device including multiple cores, it is possible to obtain a state record at an error occurrence time and thereby increase the possibility of analyzing a cause. In particular, it is possible to analyze the cause of an error without reproducing an error situation.

BRIEF DESCRIPTION OF THE DRAWINGS

FIG. 1 is a block diagram illustrating an example of a data storage device in accordance with an embodiment.

FIG. 2 is a block diagram illustrating an example of a data storage device including a plurality of cores in accordance with an embodiment.

DETAILED DESCRIPTION

Figure 3:
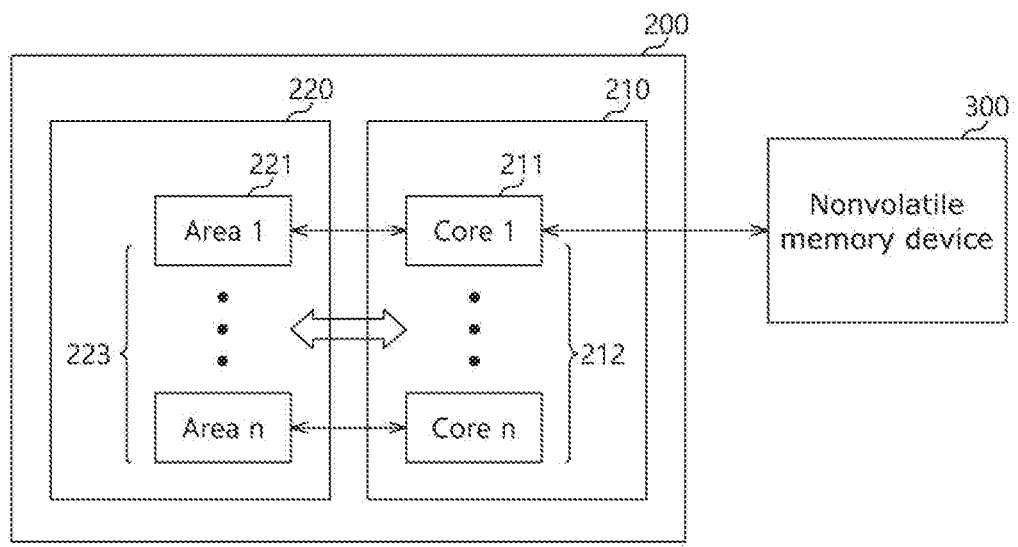
FIG. 3 is a block diagram illustrating an example of a data storage device including a plurality of areas in accordance with an embodiment.

Hereinafter, a data storage device and an operating method thereof will be described below with reference to the accompanying drawings through various examples of embodiments.

FIG. 1 is a block diagram illustrating an example of a data storage device 100 in accordance with an embodiment.

The data storage device 100 may store data to be accessed by a host device (not shown) such as a mobile phone, an MP3 player, a laptop computer, a desktop computer, a game player, a TV, an in-vehicle infotainment system, and so forth. The data storage device 100 may be referred to as a memory system.

The data storage device 100 may be manufactured as any one of various kinds of storage devices according to a host interface meaning a transmission protocol with respect to the host device. For example, the data storage device 100 may be configured as any one of various kinds of storage devices such as a solid state drive (SSD), a multimedia card in the form of an MMC, an eMMC, an RS-MMC and a micro-MMC, a secure digital card in the form of an SD, a mini-SD and a micro-SD, a universal serial bus (USB) storage device, a universal flash storage (UFS) device, a Personal Computer Memory Card International Association (PCMCIA) card type storage device, a peripheral component interconnection (PCI) card type storage device, a PCI express (PCI-E) card type storage device, a compact flash (CF) card, a smart media card, a memory stick, and so forth.

The data storage device 100 may be manufactured as any one among various kinds of package types. For example, the data storage device 100 may be manufactured as any one of various kinds of package types such as a package-on-package (POP), a system-in-package (SIP), a system-on-chip (SOC), a multi-chip package (MCP), a chip-on-board (COB), a wafer-level fabricated package (WFP) and a wafer-level stack package (WSP).

The data storage device 100 may include a controller 200. The controller 200 may include a control unit 210 and a random access memory 220.

The control unit 210 may be configured by a micro control unit (MCU) or a central processing unit (CPU). The control unit 210 may process a request which is transmitted from the host device. In order to process the request, the control unit 210 may drive an instruction or algorithm of a code type, that is, a firmware FW loaded in the random access memory 220, and may control internal function blocks and a nonvolatile memory device 300.

The random access memory 220 may be configured by a random access memory such as a dynamic random access memory (DRAM) or a static random access memory (SRAM). The random access memory 220 may store the firmware FW which is to be driven by the control unit 210. Also, the random access memory 220 may store data necessary for driving the firmware FW, for example, metadata. That is, the random access memory 220 may operate as the working memory of the control unit 210.

The nonvolatile memory device 300 may include a memory cell region. The memory cell region may include a plurality of memory blocks B1 to Bm, and each of the memory blocks B1 to Bm may include a plurality of pages P1 to Pn. From an operational viewpoint or a physical (or structural) viewpoint, the memory cells included in the memory cell region may be configured as a hierarchical memory cell set or memory cell unit. For example, memory cells which are coupled to the same word line and are to be read and written (or programmed) simultaneously may be configured as a page P. In the following descriptions, memory cells configured as a page P will be referred to as a "page." Also, memory cells to be erased simultaneously may be configured as a memory block B.

FIG. 2 is a block diagram illustrating an example of the data storage device 100 including a plurality of cores in accordance with an embodiment.

Referring to FIG. 2, the data storage device 100 in accordance with an embodiment may include the nonvolatile memory device 300 and the controller 200 which is configured to include a plurality of cores 212. When an error occurs in at least one core among the cores 212, a first core 211 coupled with the nonvolatile memory device 300 may transmit the state records of the cores 212 at an error occurrence time, to the nonvolatile memory device 300. A memory cell area of the nonvolatile memory device 300 in which the state records of one or more core among the cores 212 are stored may be set in advance and may be changed at any time.

The first core 211 means a core capable of interfacing with the nonvolatile memory device 300 among the plurality of cores 212 included in the control unit 210. The first core 211 obtains state records at a time when an error occurs in at least one core among the cores 212, even in the first core 211 itself, and transmits the state records to the nonvolatile memory device 300 such that the first core 211 may transmit the state records of the cores 212 to the nonvolatile memory device 300.

A state information may mean an information necessary for debugging. That is, the state information may include all informations necessary for finding an error, analyzing a cause of the error and correcting the error. In particular, the state information may mean a core dump. The core dump means the state of a memory which is operating at a specified time point. For example, the core dump may mean a snapshot image, a program count, a hardware register information, and the like at a specified time point. However, the core dump is not limited thereto, and all informations capable of being stored in a memory may be applied.

The cores 212 of the data storage device 100 in accordance with the embodiment may transmit state records to the first core 211 according to an interrupt command of the controller 200. The interrupt command may be to interrupt an operation being performed and to request transmission of state records at an error occurrence time to the first core 211. When an error occurs in at least one core among the cores 212, the controller 200 may transfer to the first core 211 an information on a time point at which the error occurs. The first core 211 may transmit to the nonvolatile memory device 300 state records obtained for a predetermined time from a time point at which the interrupt command is received or from a time point of the error occurrence. The predetermined time may be set by the controller 200. The predetermined time for which state records are obtained by the first core 211 may be changed at any time by the controller 200 or through a change command provided from a host device (not shown).

FIG. 3 is a block diagram illustrating an example of the data storage device 100 including a plurality of areas in accordance with an embodiment.

Referring to FIG. 3, the controller 200 of the data storage device 100 in accordance with an embodiment may further include a plurality of areas 223 which are configured to store the state records of cores 212, respectively. A first area 221 configured to store the state records of the first core 211 among the plurality of areas 223 may receive state records at an error occurrence time from the remaining areas 223 except the first area 221, and the first core 211 may transmit to a nonvolatile memory device 300 the state records stored in the first area 221. The first core 211 may be defined as a core capable of performing interfacing with the nonvolatile memory device 300. While the plurality of areas 223 may be areas which are constructed by SRAMs, the embodiment is not limited thereto, and all kinds of storage devices capable of inputting/outputting and storing data may be applied.

Figure 4:
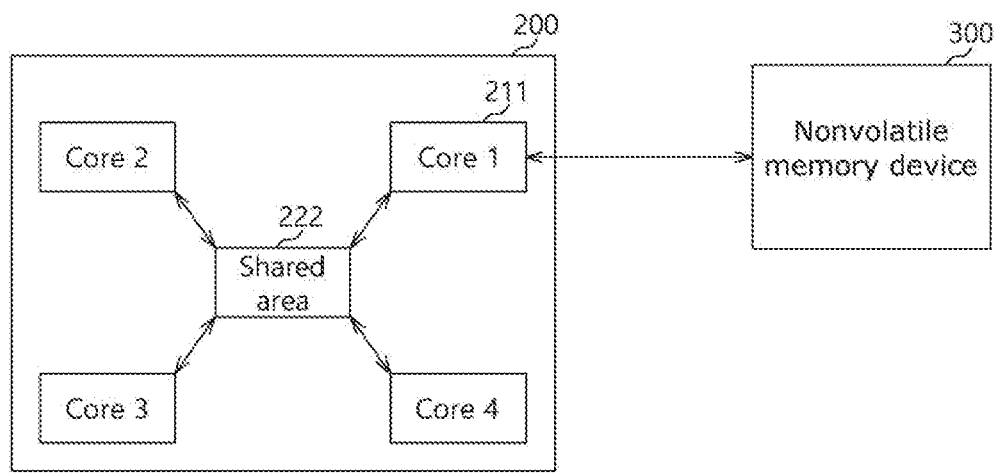
FIG. 4 is a block diagram illustrating an example of a data storage device including a shared area in accordance with an embodiment.

FIG. 4 is a block diagram illustrating an example of the data storage device 100 including a shared area in accordance with an embodiment.

Referring to FIG. 4, the controller 200 of the data storage device 100 in accordance with an embodiment may further include a shared area 222 which is configured to store the state records of cores 212, and a first core 211 may transmit state records stored in the shared area 222 to a nonvolatile memory device 300. The shared area 222 may store the state records of all or some of the cores included in the control unit 210.

In another embodiment, the plurality of areas 223 or the shared area 222 may store with a predetermined cycle, the state records of all or some of the cores included in the control unit 210. The predetermined cycle may be set or changed by the controller 200. In the case where it is set that data are stored with the predetermined cycle in the plurality of areas 223 or the shared area 222, an interrupt command may include a command commanding the data of respective cores at a time in which the interrupt command is received, to be stored. While the shared area 222 may be an area which is constructed by an SRAM, similarly to the above-described plurality of areas 223, the embodiment is not limited to the SRAM, and all kinds of storage devices capable of inputting/outputting and storing data may be applied.

Figure 5:
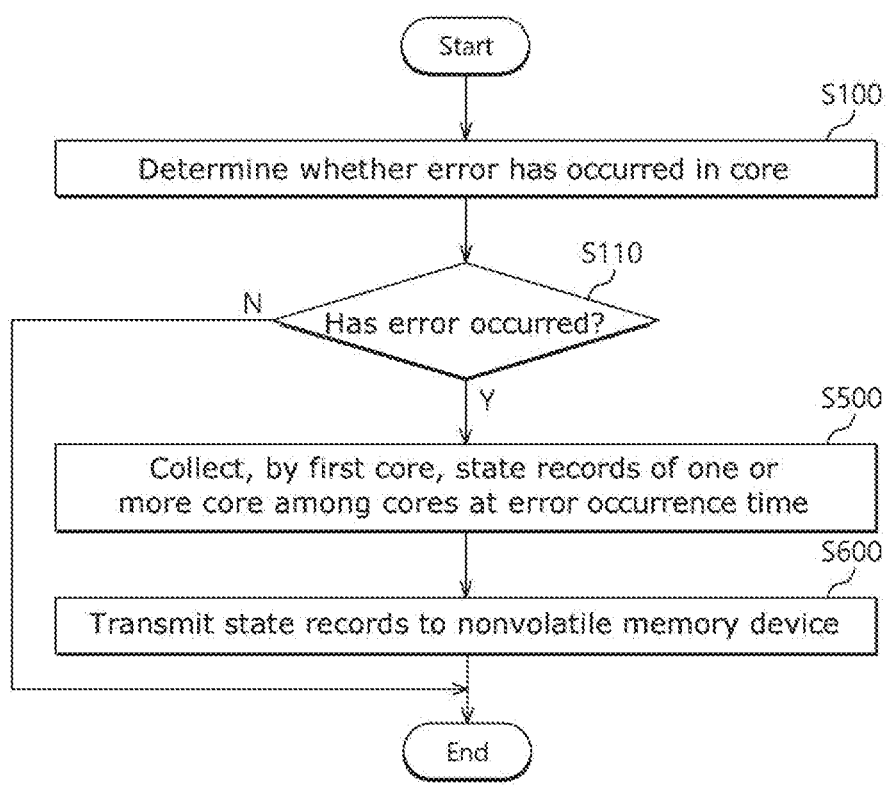
FIGS. 5 to 13 are examples of flow charts to assist in the description of methods for operating a data storage device in accordance with embodiments.

FIG. 5 is an example of a flow chart to assist in the description of a method for operating a data storage device in accordance with an embodiment.

Referring to FIG. 5, the method for operating the data storage device 100 in accordance with the embodiment may include steps S100 and S110 of determining, by the controller 200, whether an error has occurred in the plurality of cores 212, step S500 of collecting, by the first core 211, the state records of one or more core among the cores 212 at an error occurrence time when it is determined that an error has occurred, and step S600 of transmitting, by the first core 211, the state records to a nonvolatile memory device.

Figure 6:
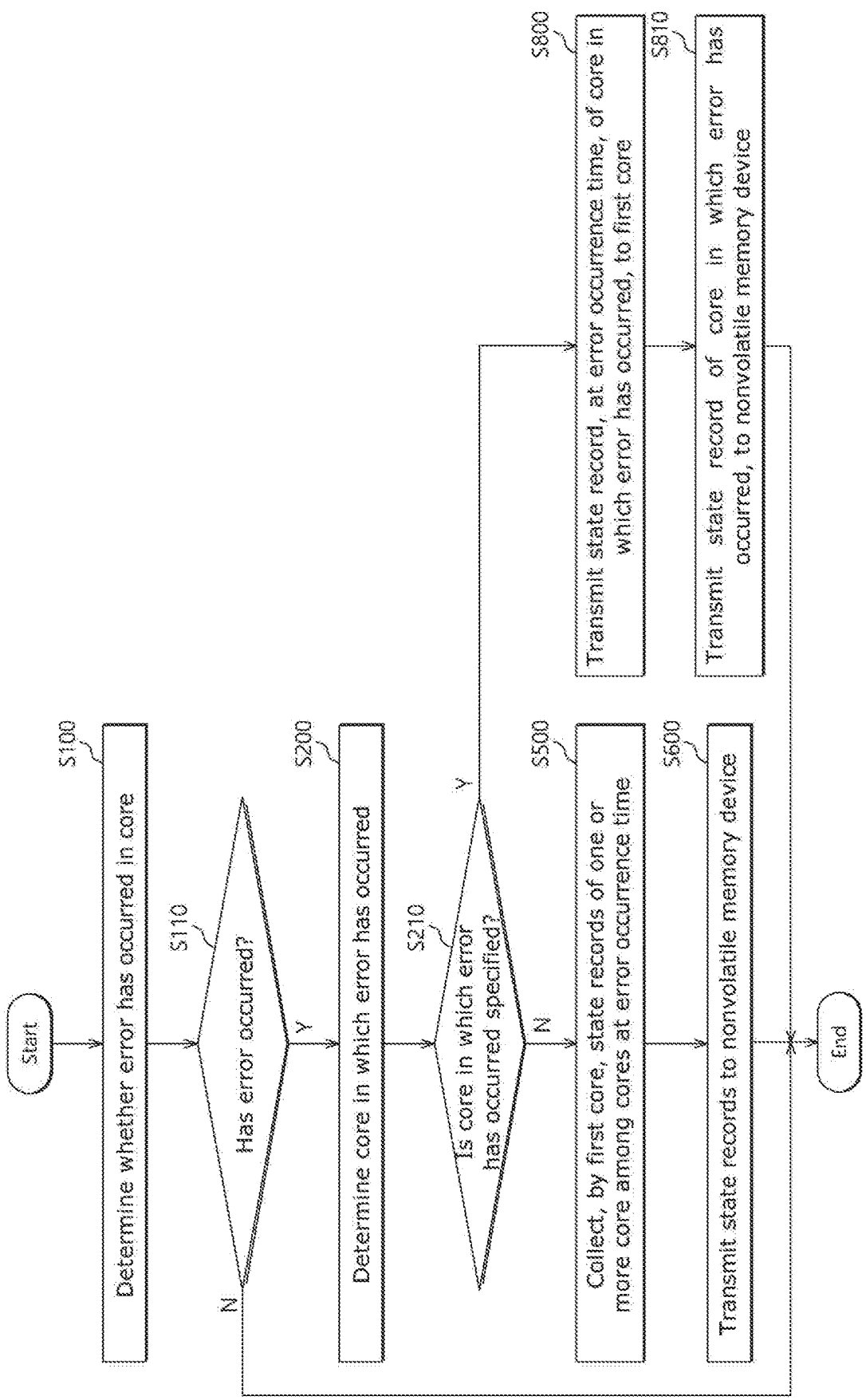

FIG. 6 is an example of a flow chart to assist in the description of a method for operating the data storage device 100 in accordance with an embodiment.

Referring to FIG. 6, the method for operating the data storage device 100 in accordance with the embodiment may further include steps S200 and S210 of determining, by the controller 211, a core in which the error has occurred among the cores 212. When the core in which the error has occurred is specified, the state record of the specified core at an error occurrence time may be transmitted to the first core from the specified core at step S800, and the first core 211 may transmit the state record of the specified core at the error occurrence time to the nonvolatile memory device at step S810.

Figure 7:
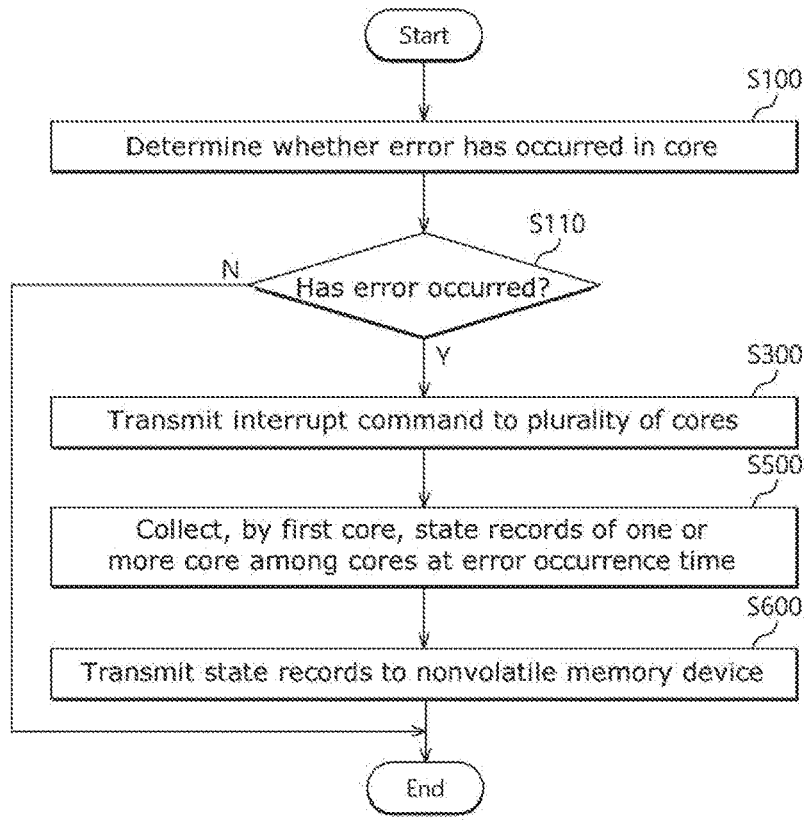

FIG. 7 is an example of a flow chart to assist in the description of a method for operating the data storage device 100 in accordance with an embodiment.

Referring to FIG. 7, the method for operating the data storage device 100 in accordance with the embodiment may further include step S300 of transmitting, by the controller 200, an interrupt command to the cores 212 when it is determined that an error has occurred. The interrupt command may be to interrupt an operation being performed and to request transmission of state records at an error occurrence time to the first core.

Figure 8:
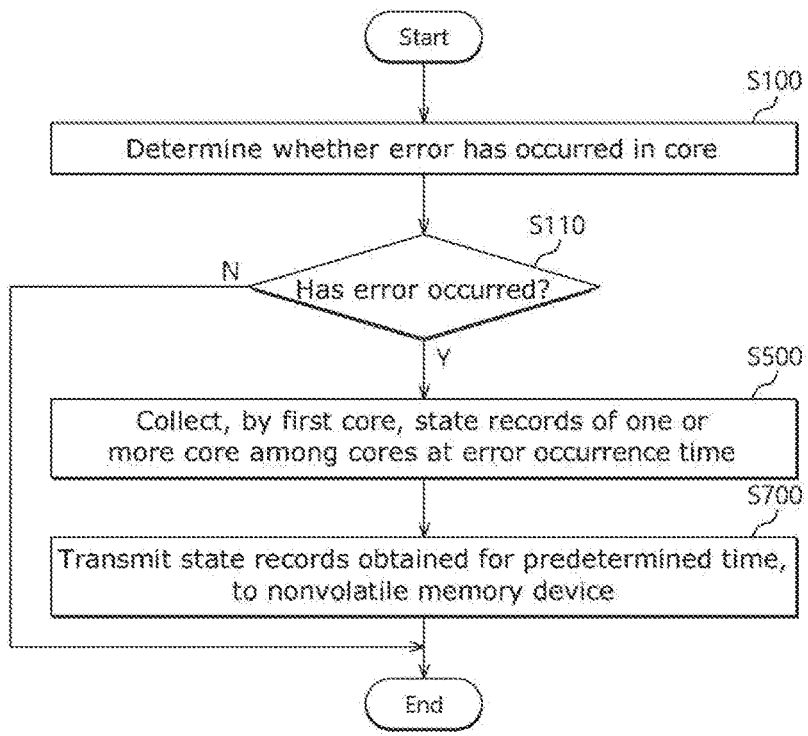

FIG. 8 is an example of a flow chart to assist in the description of a method for operating the data storage device 100 in accordance with an embodiment.

Referring to FIG. 8, in the method for operating the data storage device 100 in accordance with an embodiment, the step S500 of collecting, by the first core 211, the state records of one or more core among the cores 212 at an error occurrence time when it is determined that an error has occurred may be performed for a predetermined time from the error occurrence time. In this case, the step S600 of transmitting the state records to the nonvolatile memory device 300 from the first core may be replaced with step S700 of transmitting the state records, which are collected for the predetermined time, to the nonvolatile memory device from the first core 211.

Also referring to FIG. 8, in the method for operating the data storage device 100 in accordance with an embodiment, the step S500 of collecting, by the first core 211, the state records of one or more core among the cores 212 at an error occurrence time when it is determined that an error has occurred. In this case, the step S600 of transmitting the state records to the nonvolatile memory device 300 from the first core may be replaced with step S700 of transmitting the state records, which are collected for the predetermined time, to the nonvolatile memory device from the first core 211.

Figure 9:
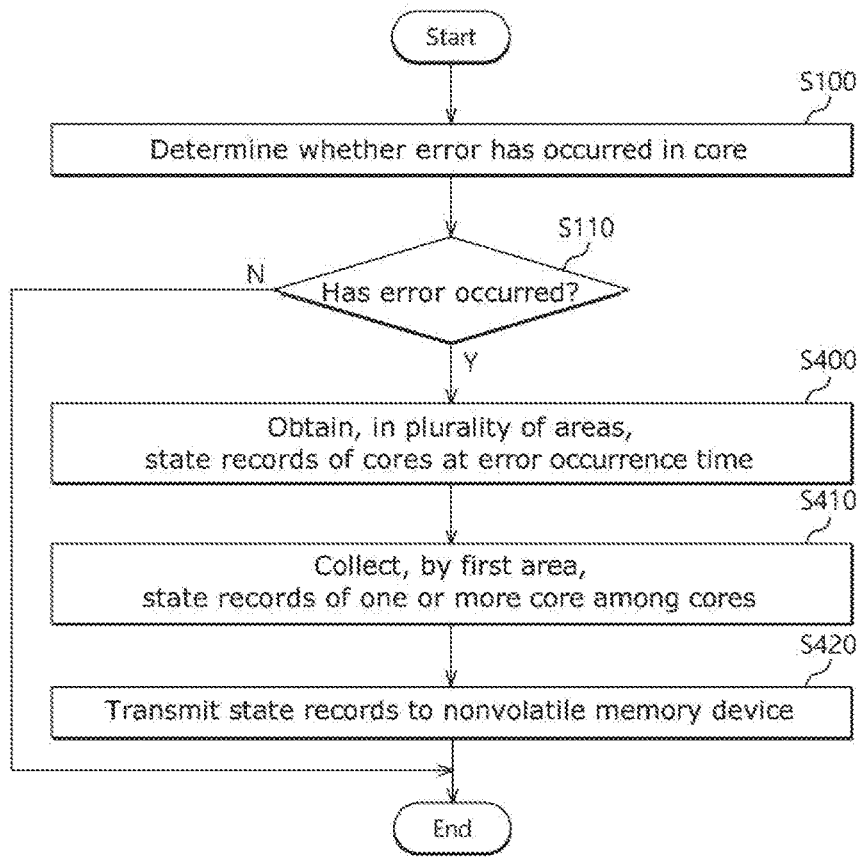

FIG. 9 is an example of a flow chart to assist in the description of a method for operating a data storage device in accordance with an embodiment.

Referring to FIG. 9, in the method for operating the data storage device 100 in accordance with the embodiment, the step S500 of collecting, by the first core 211, the state records of one or more among the cores 212 at an error occurrence time when it is determined that an error has occurred may include step S400 of obtaining, by the plurality of areas 223 which respectively store the state records of the cores 212, the state records at the error occurrence time when it is determined that an error has occurred and step S410 of collecting the state records of one or more core among the cores 212 by the first area 221 which stores the state records of the first core 211. In this case, the step S600 of transmitting the state records to the nonvolatile memory device 300 from the first core may be replaced with step S420 of transmitting the state records stored in the first area 221 to the nonvolatile memory device 300. While the plurality of areas may be areas which are constructed by SRAMs, the embodiment is not limited thereto, and all types of storage devices capable of inputting/outputting and storing data may be applied.

Figure 10:
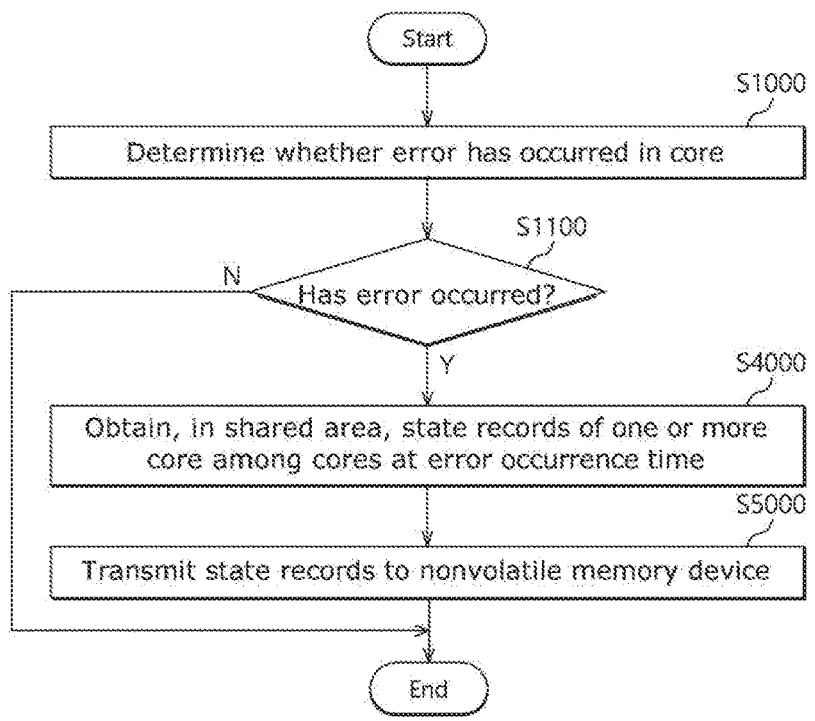

FIG. 10 is an example of a flow chart to assist in the description of a method for operating the data storage device 100 in accordance with an embodiment.

Referring to FIG. 10, the method for operating the data storage device 100 in accordance with the embodiment may include steps S1000 and S1100 of determining, by the controller 200, whether an error has occurred in the plurality of cores 212, step S4000 of obtaining, by the shared area 222 which stores the state records of the cores 212, the state records of one or more core among the cores 212 at an error occurrence time when it is determined that an error has occurred, and step S5000 of transmitting, by the first core 211, the state records stored in the shared area 222 to the nonvolatile memory device 300. While the shared area may be an area which is constructed by an SRAM, similarly to the above-described plurality of areas, all types of storage devices capable of inputting/outputting and storing data may be applied.

Figure 11:
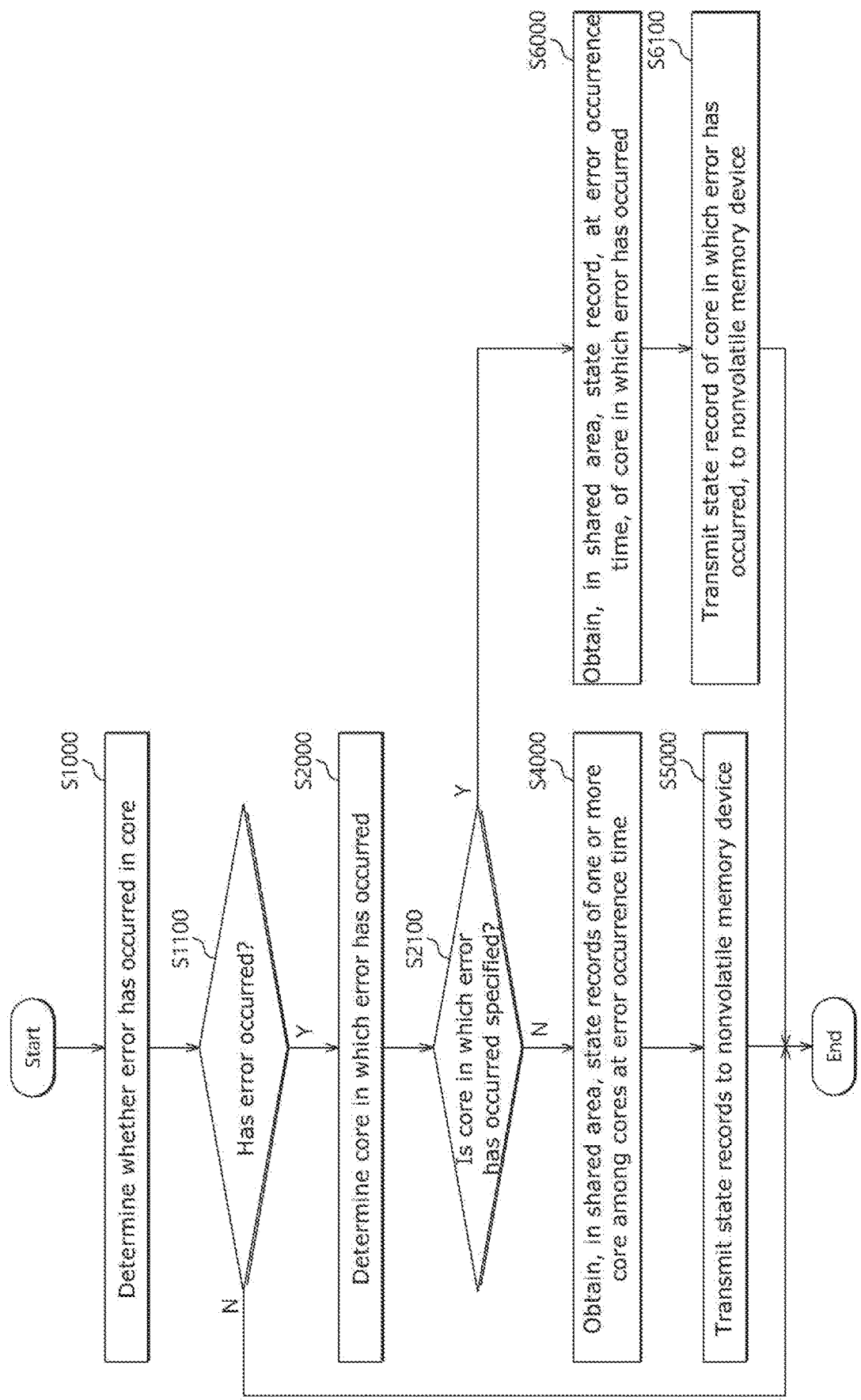

FIG. 11 is an example of a flow chart to assist in the description of a method for operating the data storage device 100 in accordance with an embodiment.

Referring to FIG. 11, the method for operating the data storage device 100 in accordance with the embodiment may further include steps S2000 and S2100 of determining, by the controller 211, a core in which the error has occurred among the cores 212. When the core in which the error has occurred is specified, the state record of the specified core at an error occurrence time may be obtained by the shared area 222 at step S6000, and the first core 211 may transmit the state record of the specified core stored in the shared area 222 to the nonvolatile memory device at step S6100.

Figure 12:
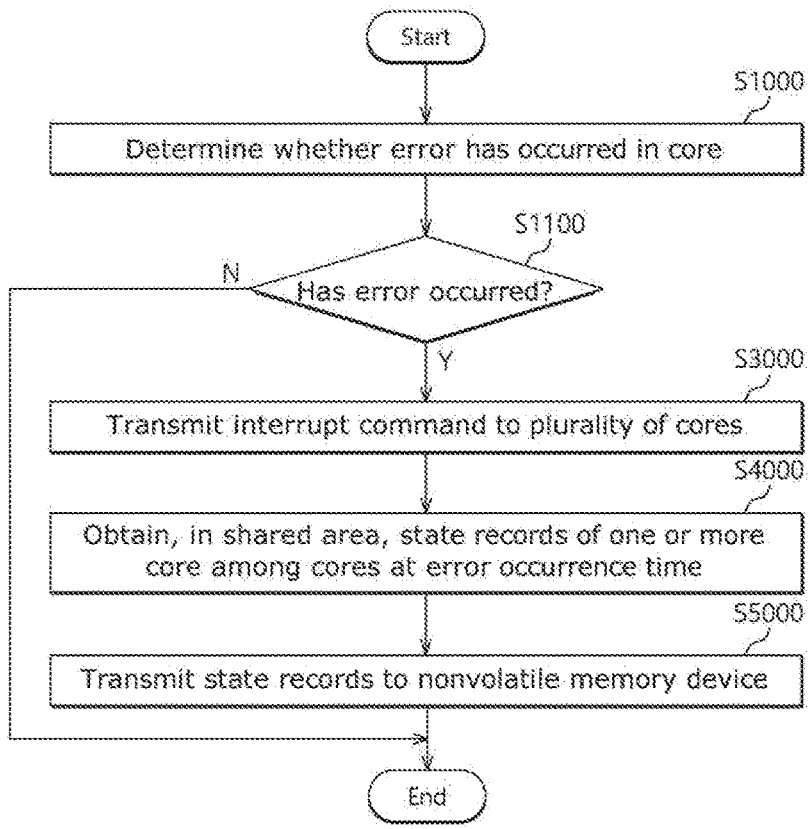

FIG. 12 is an example of a flow chart to assist in the description of a method for operating the data storage device 100 in accordance with an embodiment.

Referring to FIG. 12, the method for operating the data storage device 100 in accordance with the embodiment may further include step S300 of transmitting, by the controller 200, an interrupt command to the cores 212 when it is determined that an error has occurred. The interrupt command may be to interrupt an operation being performed and to request transmission of state records at an error occurrence time to the shared area.

Figure 13:
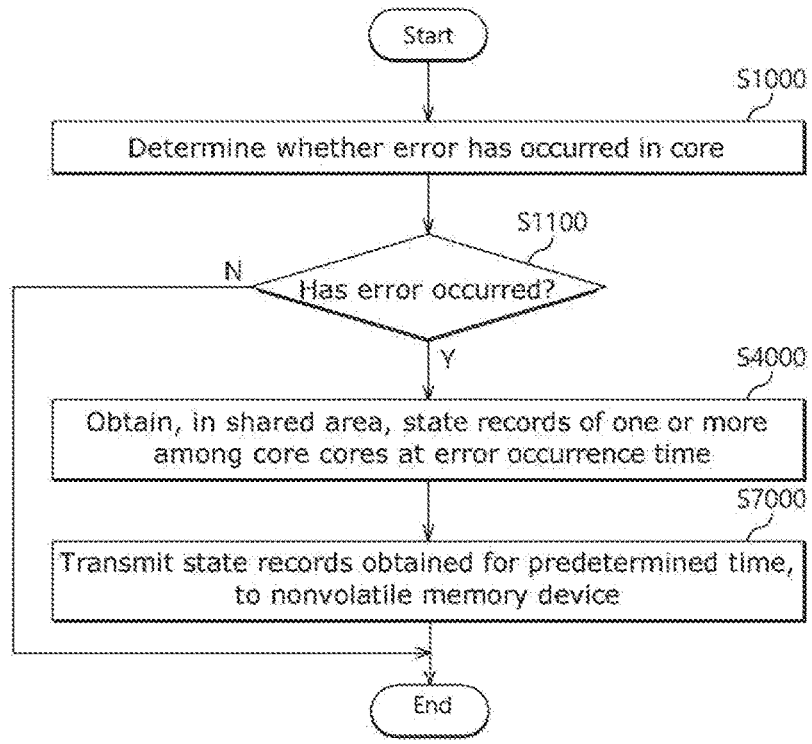

FIG. 13 is an example of a flow chart to assist in the description of a method for operating the data storage device 100 in accordance with an embodiment.

Referring to FIG. 13, in the method for operating the data storage device 100 in accordance with an embodiment, the step S4000 of obtaining, by the shared area 222, the state records of one or more core among the cores 212 at an error occurrence time when it is determined that an error has occurred may be performed for a predetermined time from the error occurrence time. In this case, the step S5000 of transmitting, by the first core 211, the state records stored in the shared area 222 to the nonvolatile memory device 300 may be replaced with step S7000 of transmitting, by the first core 211, the state records, which are obtained for the predetermined time, to the nonvolatile memory device 300 from the first core 211.

Also referring to FIG. 13, in the method for operating the data storage device 100 in accordance with an embodiment, the step S4000 of obtaining, by the shared area 222, the state records of one or more core among the cores 212 at an error occurrence time when it is determined that an error has occurred may be performed for a predetermined time from a time at which the interrupt command is received. In this case, the step S5000 of transmitting, by the first core 211, the state records stored in the shared area 222 to the nonvolatile memory device 300 may be replaced with step S7000 of transmitting, by the first core 211, the state records, which are obtained for the predetermined time, to the nonvolatile memory device 300 from the first core 211.

Figure 14:
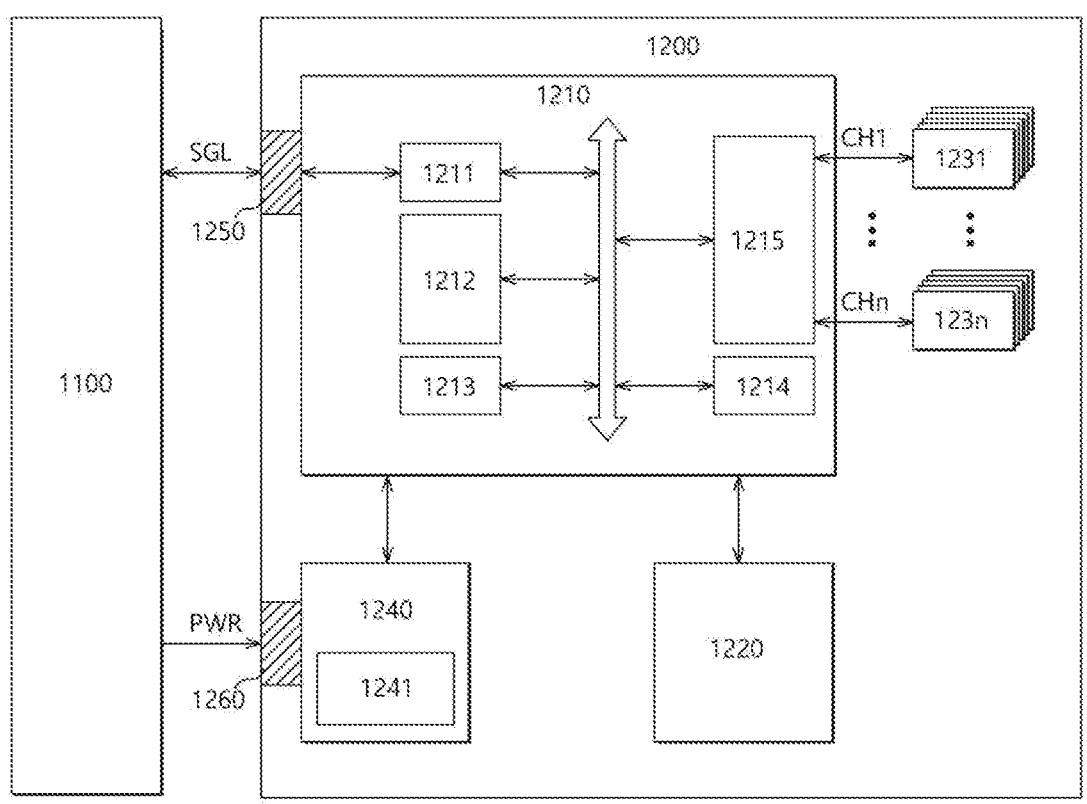
FIG. 14 is a diagram illustrating an example of a data processing system including a solid state drive (SSD) in accordance with an embodiment.

FIG. 14 is a diagram illustrating an example of a data processing system including a solid state drive (SSD) in accordance with an embodiment. Referring to FIG. 14, a data processing system 1000 may include a host device 1100 and a solid state drive (SSD) 1200.

The SSD 1200 may include a controller 1210, a buffer memory device 1220, nonvolatile memory devices 1231 to 123n, a power supply 1240, a signal connector 1250, and a power connector 1260.

The controller 1210 may control general operations of the SSD 1200. The controller 1210 may include a host interface unit 1211, a control unit 1212, a random access memory 1213, an error correction code (ECC) unit 1214, and a memory interface unit 1215.

The host interface unit 1211 may exchange a signal SGL with the host device 1100 through the signal connector 1250. The signal SGL may include a command, an address, data, and so forth. The host interface unit 1211 may interface the host device 1100 and the SSD 1200 according to the protocol of the host device 1100. For example, the host interface unit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (DATA), serial advanced technology attachment (SATA), small computer system interface (SCSI), serial attached SCSI (SAS), peripheral component interconnection (PCI), PCI express (PCI-E) and universal flash storage (UFS).

The control unit 1212 may analyze and process a signal SGL inputted from the host device 1100. The control unit 1212 may control operations of internal function blocks according to a firmware or a software for driving the SSD 1200. The random access memory 1213 may be used as a working memory for driving such a firmware or software.

The error correction code (ECC) unit 1214 may generate the parity data of data to be transmitted to the nonvolatile memory devices 1231 to 123n. The generated parity data may be stored together with the data in the nonvolatile memory devices 1231 to 123n. The error correction code (ECC) unit 1214 may detect an error of the data read out from the nonvolatile memory devices 1231 to 123n, based on the parity data. If a detected error is within a correctable range, the error correction code (ECC) unit 1214 may correct the detected error.

The memory interface unit 1215 may provide control signals such as commands and addresses to the nonvolatile memory devices 1231 to 123n, according to control of the control unit 1212. Moreover, the memory interface unit 1215 may exchange data with the nonvolatile memory devices 1231 to 123n, according to control of the control unit 1212. For example, the memory interface unit 1215 may provide the data stored in the buffer memory device 1220, to the nonvolatile memory devices 1231 to 123n, or provide the data read out from the nonvolatile memory devices 1231 to 123n, to the buffer memory device 1220.

The buffer memory device 1220 may temporarily store data to be stored in the nonvolatile memory devices 1231 to 123n. Further, the buffer memory device 1220 may temporarily store the data read out from the nonvolatile memory devices 1231 to 123n. The data temporarily stored in the buffer memory device 1220 may be transmitted to the host device 1100 or the nonvolatile memory devices 1231 to 123n according to control of the controller 1210.

The nonvolatile memory devices 1231 to 123n may be used as storage media of the SSD 1200. The nonvolatile memory devices 1231 to 123n may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 15:
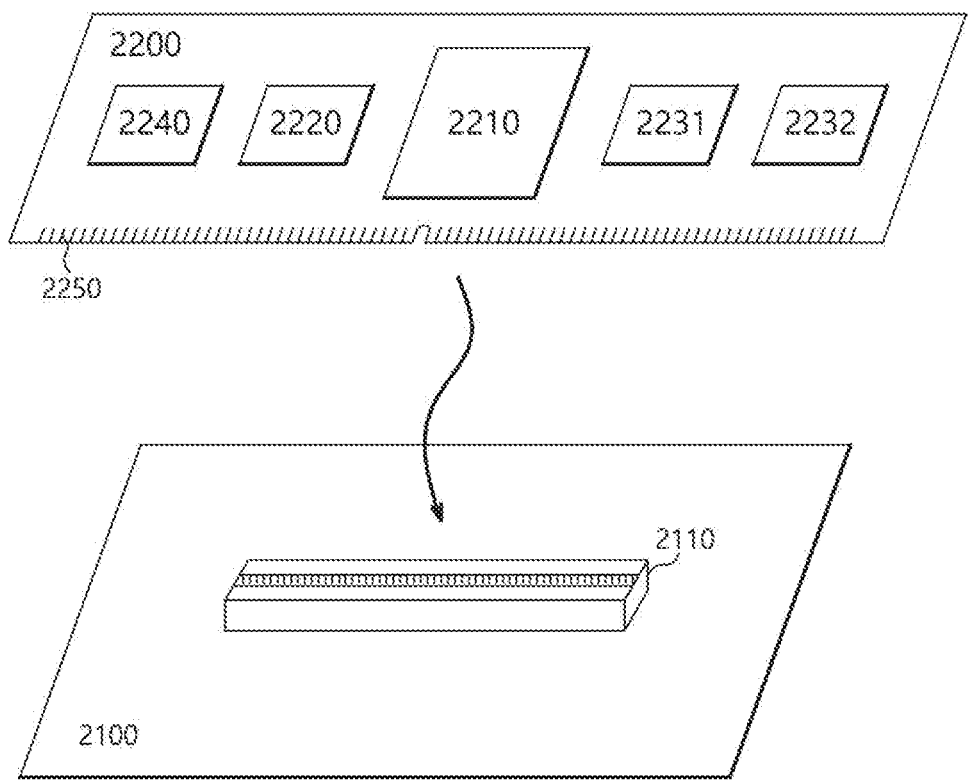
FIG. 15 is a diagram illustrating an example of a data processing system including a data storage device in accordance with an embodiment.

FIG. 15 is a diagram illustrating an example of a data processing system including a data storage device in accordance with an embodiment. Referring to FIG. 15, a data processing system 2000 may include a host device 2100 and a data storage device 2200.

The host device 2100 may be configured in the form of a board such as a printed circuit board. Although not shown, the host device 3100 may include internal function blocks for performing the function of a host device.

The host device 2100 may include a connection terminal 2110 such as a socket, a slot or a connector. The data storage device 2200 may be mounted to the connection terminal 2110.

The data storage device 2200 may be configured in the form of a board such as a printed circuit board. The data storage device 2200 may be referred to as a memory module or a memory card. The data storage device 2200 may include a controller 2210, a buffer memory device 2220, nonvolatile memory devices 2231 and 2232, a power management integrated circuit (PMIC) 2240, and a connection terminal 2250.

The controller 2210 may control general operations of the data storage device 2200. The controller 2210 may be configured in the same manner as the controller 1210 shown in FIG. 14.

The buffer memory device 2220 may temporarily store data to be stored in the nonvolatile memory devices 2231 and 2232. Further, the buffer memory device 2220 may temporarily store the data read out from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the data storage device 2200.

The PMIC 2240 may provide the power inputted through the connection terminal 2250, to the inside of the data storage device 2200. The PMIC 2240 may manage the power of the data storage device 2200 according to control of the controller 2210.

The connection terminal 2250 may be coupled to the connection terminal 2110 of the host device 2100. Through the connection terminal 2250, signals such as commands, addresses, data and so forth, and power may be transferred between the host device 2100 and the data storage device 2200. The connection terminal 2250 may be configured into various types depending on an interface scheme between the host device 2100 and the data storage device 2200. The connection terminal 2250 may be disposed on any one side of the data storage device 2200.

Figure 16:
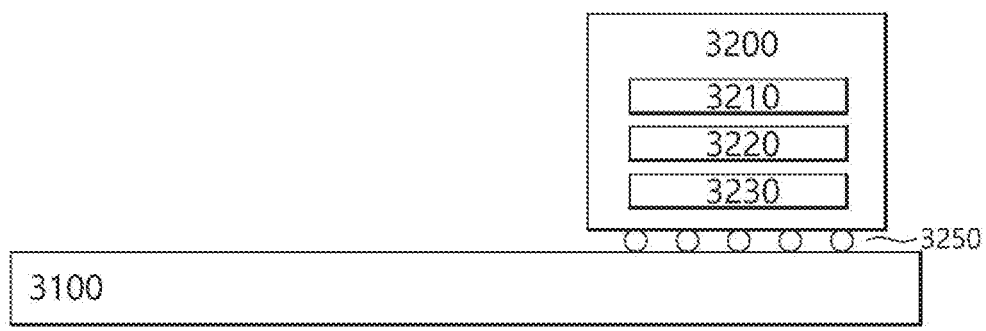
FIG. 16 is a diagram illustrating an example of a data processing system including a data storage device in accordance with an embodiment.

FIG. 16 is a diagram illustrating an example of a data processing system including a data storage device in accordance with an embodiment. Referring to FIG. 16, a data processing system 3000 may include a host device 3100 and a data storage device 3200.

The host device 3100 may be configured in the form of a board such as a printed circuit board. Although not shown, the host device 3100 may include internal function blocks for performing the function of a host device.

The data storage device 3200 may be configured in the form of a surface-mounting type package. The data storage device 3200 may be mounted to the host device 3100 through solder balls 3250. The data storage device 3200 may include a controller 3210, a buffer memory device 3220, and a nonvolatile memory device 3230.

The controller 3210 may control general operations of the data storage device 3200. The controller 3210 may be configured in the same manner as the controller 1210 shown in FIG. 9.

The buffer memory device 3220 may temporarily store data to be stored in the nonvolatile memory device 3230. Further, the buffer memory device 3220 may temporarily store the data read out from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as a storage medium of the data storage device 3200.

Figure 17:
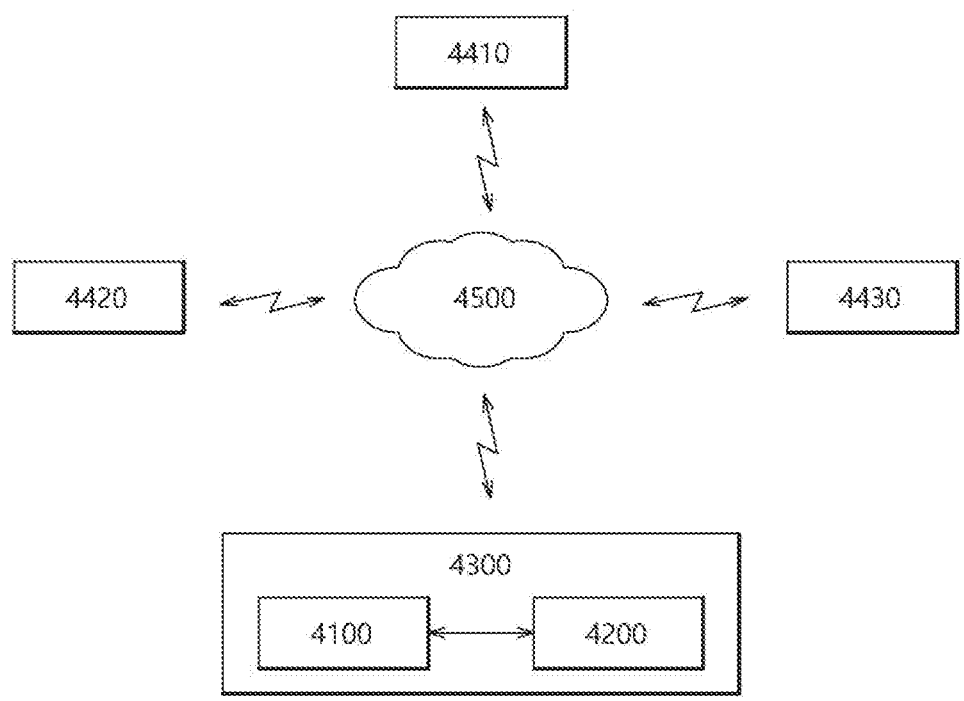
FIG. 17 is a diagram illustrating an example of a network system including a data storage device in accordance with an embodiment.

FIG. 17 is a diagram illustrating an example of a network system including a data storage device in accordance with an embodiment. Referring to FIG. 17, a network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and a data storage device 4200. The data storage device 4200 may be constructed by the data storage device 100 shown in FIG. 1, the SSD 1200 shown in FIG. 14, the data storage device 2200 shown in FIG. 15 or the data storage device 3200 shown in FIG. 16.

Figure 18:
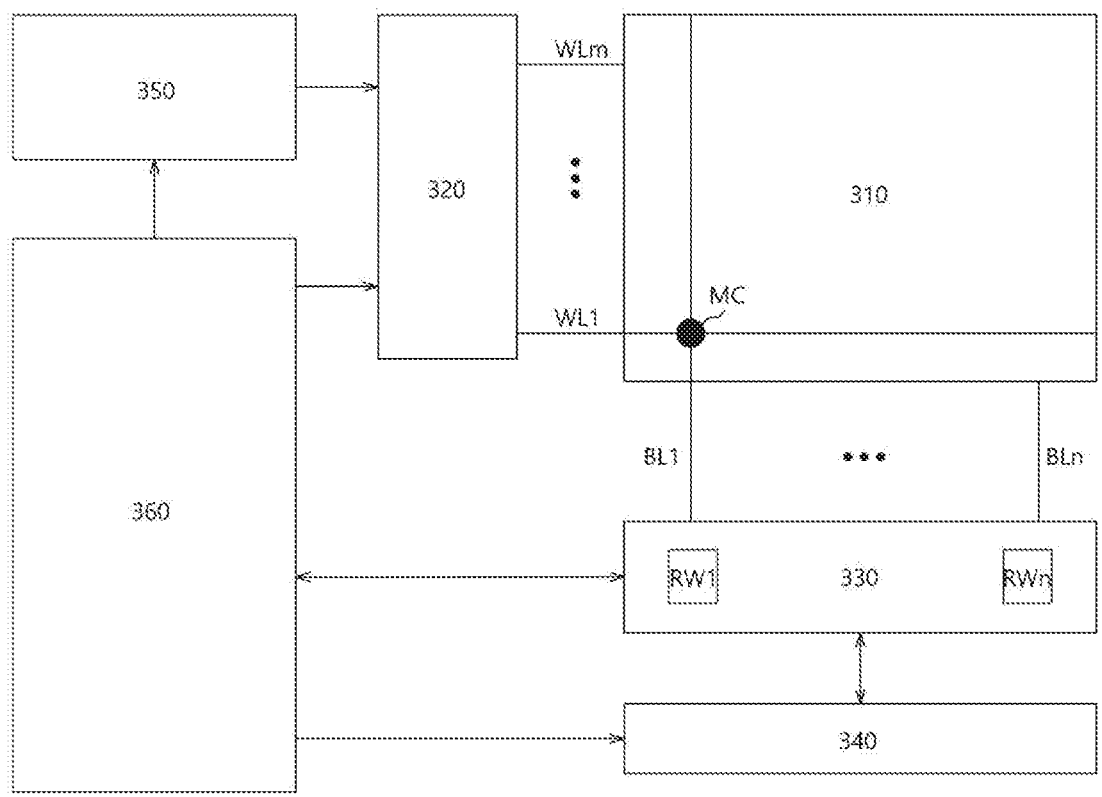
FIG. 18 is a block diagram illustrating an example of a nonvolatile memory device included in a data storage device in accordance with an embodiment.

FIG. 18 is a block diagram illustrating an example of a nonvolatile memory device included in a data storage device in accordance with an embodiment. Referring to FIG. 18, a nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to the control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to the control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines (or data input/output buffers), based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For still another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control the read, write and erase operations of the nonvolatile memory device 300.

While various embodiments have been described above, it will be understood to those skilled in the art that the embodiments described are examples only. Accordingly, the data storage device and the operating method thereof described herein should not be limited based on the described embodiments.

What is claimed is:

1. A data storage device comprising:
a nonvolatile memory device; and
a controller configured to include a plurality of cores, of which a first core is capable of interfacing with the nonvolatile memory device, and the other cores are not capable of interfacing with the nonvolatile memory device,
wherein, when an error occurs in at least one core among the cores, the first core transmits state records of one or more core among the cores at an error occurrence time, to the nonvolatile memory device.

2. The data storage device according to claim 1,
wherein the cores transmit the state records to the first core, according to an interrupt command of the controller, and
wherein the interrupt command is a command which interrupts an operation being performed and commands the state records at the error occurrence time to be transmitted to the first core.

3. The data storage device according to claim 2,
wherein the first core transmits the state records obtained for a predetermined time from a time when the interrupt command is received, to the nonvolatile memory device, and
wherein the predetermined time is set by the controller.

4. The data storage device according to claim 1,
wherein the controller further includes a plurality of areas which are configured to store data of the cores,
wherein a first area which stores the data of the first core receives the state records at the error occurrence time, from remaining areas except the first area, and
wherein the first core transmits the state records stored in the first area, to the nonvolatile memory device.

5. The data storage device according to claim 4, wherein the plurality of areas are areas which are configured by SRAMs.

6. The data storage device according to claim 1,
wherein the controller further includes a shared area which is configured to store data of the cores, and
wherein the first core transmits state records based on the data, to the nonvolatile memory device.

7. The data storage device according to claim 6, wherein the shared area is an area which is configured by an SRAM.

8. The data storage device according to claim 1,
wherein the first core stores the state records obtained for a predetermined time from the error occurrence time, in the nonvolatile memory device, and
wherein the predetermined time is set by the controller.

9. A method for operating a data storage device including a nonvolatile memory device and a controller configured to include a plurality of cores, of which a first core is capable of interfacing with the nonvolatile memory device, and the other cores are not capable of interfacing with the nonvolatile memory device, the method comprising:
determining, by the controller, whether an error has occurred in the plurality of cores;
collecting, when an error has occurred, state records of one or more core among the cores at an error occurrence time, by the first core; and
transmitting, by the first core, the state records to the nonvolatile memory device.

10. The method according to claim 9, further comprising:
determining a core in which the error has occurred, by the controller,
wherein, when the core in which the error has occurred is specified, a state record, at the error occurrence time, of the core in which the error has occurred, is transmitted from the core in which the error has occurred, to the first core, and
wherein the first core transmits the state record to the nonvolatile memory device.

11. The method according to claim 9, wherein the transmitting of the state records to the nonvolatile memory device comprises:
obtaining, by the first core, the state records for a predetermined time from the error occurrence time; and
transmitting the obtained state records to the nonvolatile memory device from the first core.

12. The method according to claim 9, further comprising:
transmitting, when an error has occurred, an interrupt command to the cores from the controller,
wherein the interrupt command is a command which interrupts an operation being performed and commands the state records at the error occurrence time to be transmitted to the first core.

13. The method according to claim 12, wherein the transmitting of the state records to the nonvolatile memory device comprises:
obtaining, by the first core, the state records for a predetermined time from a time when the interrupt command is received; and
transmitting the obtained state records to the nonvolatile memory device from the first core.

14. The method according to claim 9, wherein the transmitting of the state records to the first core from the cores comprises:

obtaining, when an error has occurred, the state records at the error occurrence time, by a plurality of areas which store data of the respective cores; and
collecting state records of one or more core among the cores, by a first area which stores the data of the first core.

15. The method according to claim 14, wherein the areas are areas which are configured by SRAMs.

16. A method for operating a data storage device including a nonvolatile memory device and a controller configured to include a plurality of cores, of which a first core is capable of interfacing with the nonvolatile memory device, and the other cores are not capable of interfacing with the nonvolatile memory device, the method comprising:
determining, by the controller, whether an error has occurred in the plurality of cores;
obtaining, when an error has occurred, state records of one or more among the cores at an error occurrence time based on data of cores, in a shared area in which the data of the cores are stored; and
transmitting, by the first core, the state records stored in the shared area, to the nonvolatile memory device.

17. The method according to claim 16, further comprising:
determining a core in which the error has occurred, by the controller,
wherein, when a core in which the error has occurred is specified, a state record of the core in which the error has occurred, at the error occurrence time, is obtained by the shared area, and the state record stored in the shared area is transmitted to the nonvolatile memory device by the first core.

18. The method according to claim 16, wherein the transmitting of the state records to the nonvolatile memory device by the first core comprises:
obtaining, by the shared area, the state records for a predetermined time from the error occurrence time; and
transmitting the obtained state records to the nonvolatile memory device by the first core.

19. The method according to claim 16, further comprising:
transmitting, when an error has occurred, an interrupt command to the cores from the controller,
wherein the interrupt command is a command which interrupts an operation being performed and commands the state records at the error occurrence time to be transmitted to the shared area.

20. The method according to claim 19, wherein the transmitting of the state records to the nonvolatile memory device by the first core comprises:
obtaining, by the shared area, the state records for a predetermined time from a time when the interrupt command is received; and
transmitting the obtained state records to the nonvolatile memory device by the first core.

* * * * *